United States Patent
Bellinger (10) Patent No.: US 10,670,443 B2
(45) Date of Patent: Jun. 2, 2020

(54) WIRELESS LIQUID GAUGING SYSTEM

(71) Applicant: Simmonds Precision Products, Inc., Vergennes, VT (US)

(72) Inventor: Mark Bellinger, Cornwall, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 293 days.

(21) Appl. No.: 15/826,481

(22) Filed: Nov. 29, 2017

(65) Prior Publication Data

US 2019/0162574 A1    May 30, 2019

(51) Int. Cl.

| | | |
|---|---|---|
| *G01F 23/00* | (2006.01) | |
| *G01F 23/16* | (2006.01) | |
| *G01L 19/14* | (2006.01) | |
| *G01L 19/08* | (2006.01) | |
| *G01L 19/00* | (2006.01) | |
| *G01L 9/00* | (2006.01) | |
| *G01F 23/18* | (2006.01) | |
| *G01F 22/02* | (2006.01) | |

(52) U.S. Cl.
CPC ........ *G01F 23/0076* (2013.01); *G01F 23/164* (2013.01); *G01L 9/0041* (2013.01); *G01L 19/0092* (2013.01); *G01L 19/086* (2013.01); *G01L 19/14* (2013.01); *G01L 19/149* (2013.01); *G01F 22/02* (2013.01); *G01F 23/0061* (2013.01); *G01F 23/18* (2013.01)

(58) Field of Classification Search
None
See application file for complete search history.

(56) References Cited

U.S. PATENT DOCUMENTS

| | | |
|---|---|---|
| 8,763,956 B2 | 7/2014 | Beck |
| 9,451,339 B2 | 9/2016 | Kauffman et al. |
| 9,745,075 B2 | 8/2017 | Stumpf |
| 2006/0033631 A1* | 2/2006 | Cupples .............. G01F 23/0069 340/612 |
| 2008/0036615 A1 | 2/2008 | Lyall, III |

(Continued)

FOREIGN PATENT DOCUMENTS

EP    1355135 A2    10/2003

OTHER PUBLICATIONS

Extended European Search Report for EP Application No. 18208961.5, dated Apr. 5, 2019, pp. 9.

*Primary Examiner* — Natalie Huls
*Assistant Examiner* — Jermaine L Jenkins
(74) *Attorney, Agent, or Firm* — Kinney & Lange, P.A.

(57) ABSTRACT

A wireless pressure sensor for sensing pressure of a liquid in a tank includes a hermetically sealed housing, at least one sensor, at least one photocell array, at least one communication device, and at least one energy storage device. At least a portion of the hermetically sealed housing has a diaphragm. The at least one sensor within the hermetically sealed housing is configured to sense the pressure of the liquid. The at least one photocell array is configured to receive light and generate power from the light. The at least one communication device is configured to transmit data corresponding to the sensed pressure using wireless radio frequency signals. The at least one energy storage device is configured to store power generated by the at least one photocell array and provide power to the at least one sensor and the at least one communication device.

20 Claims, 4 Drawing Sheets

(56) References Cited

U.S. PATENT DOCUMENTS

| | | | |
|---|---|---|---|
| 2013/0132004 A1* | 5/2013 | Georgeson | G01F 23/303 |
| | | | 702/55 |
| 2013/0238145 A1* | 9/2013 | Hammer | G01F 23/0023 |
| | | | 700/279 |
| 2014/0373622 A1* | 12/2014 | Kline | B64D 37/005 |
| | | | 73/290 R |
| 2015/0369647 A1* | 12/2015 | Kumar | G06Q 30/04 |
| | | | 705/34 |
| 2016/0031394 A1 | 2/2016 | Irish et al. | |
| 2017/0097254 A1* | 4/2017 | Smith | G01F 23/14 |
| 2017/0336240 A1 | 11/2017 | Daneyshar et al. | |

* cited by examiner

WIRELESS LIQUID GAUGING SYSTEM

BACKGROUND

In many fuel and flammable liquid measurement applications it is important to know the quantity of liquid in a storage tank. Herein, quantity refers to volume and mass. In aircraft, the confirmation of fuel quantity is used after refueling to support flight planning. Typically, this is performed with a secondary system composed of magnetic float level indicators. Magnetic float level indicators are manually operated sensors. A float containing a magnet is allowed to move vertically along a sealed cylinder and sits at the plane of the fuel level. A calibrated staff residing with the cylinder contains a magnet at its tip. The staff can be unlocked and lowered until the two magnets couple. An operator can measure the fuel level from the scale on the staff and a fixed reference, such as the bottom of the aircraft wing. The operator must obtain a lift to read the scale on the staff. The operator can then determine fuel volume using the fuel level, aircraft attitude, and a height to volume lookup table. The operator can then take a fuel density sample to convert volume to mass. Manually checking the fuel level in this manner is time consuming.

SUMMARY

In one example, a wireless pressure sensor for sensing pressure of a liquid in a tank comprises a hermetically sealed housing, at least one sensor, at least one photocell array, at least one communication device, and at least one energy storage device. At least a portion of the hermetically sealed housing has a diaphragm. The hermetically sealed housing forms at least a portion of a hermetically sealed wall of the tank. The at least one sensor within the hermetically sealed housing is configured to sense the pressure of the liquid. The at least one photocell array is configured to receive light and generate power from the light. The at least one communication device is configured to transmit data corresponding to the sensed pressure using wireless radio frequency signals. The at least one energy storage device is configured to store power generated by the at least one photocell array and provide power to the at least one sensor and the at least one communication device.

In one example, a system comprises a wireless pressure sensor for sensing pressure of a liquid in a tank and a computing device. The wireless pressure sensor comprises a hermetically sealed housing, at least one sensor, at least one photocell array, at least one communication device, and at least one energy storage device. At least a portion of the hermetically sealed housing has a diaphragm. The hermetically sealed housing forms at least a portion of a hermetically sealed wall of the tank. The at least one sensor within the hermetically sealed housing is configured to sense the pressure of the liquid. The at least one photocell array is configured to receive light and generate power from the light. The at least one communication device is configured to transmit data corresponding to the sensed pressure using wireless radio frequency signals. The at least one energy storage device is configured to store power generated by the at least one photocell array and provide power to the at least one sensor and the at least one communication device. The computing device is configured to receive the data from the at least one communication device.

In one example, a method for sensing a pressure of a liquid of a tank comprises receiving light via a photocell array; generating, in response to receiving the light, power from the received light using the photocell array; storing power, in response to power being generated, using one or more energy storage devices; powering, in response to the power being stored, at least one communication device and at least one sensor; receiving a query from a computing device using at least one communication device; sensing, in response to receiving the query, the pressure of the liquid of the tank using at least one sensor; and transmitting, in response to sensing the pressure, data corresponding to the sensed pressure of the liquid using the at least one communication device.

DETAILED DESCRIPTION

Apparatus, systems, and associated methods relate to determining a liquid quantity of a tank using a computing device and a wireless pressure sensor. Manually checking and calculating the liquid quantity of an aircraft tank is cumbersome, time consuming, and prone to error. Using the apparatus, systems, and associated methods herein, allows for the liquid quantity to be determined quickly, without the operator leaving the ground and without obtaining a liquid sample.

Figure 1:
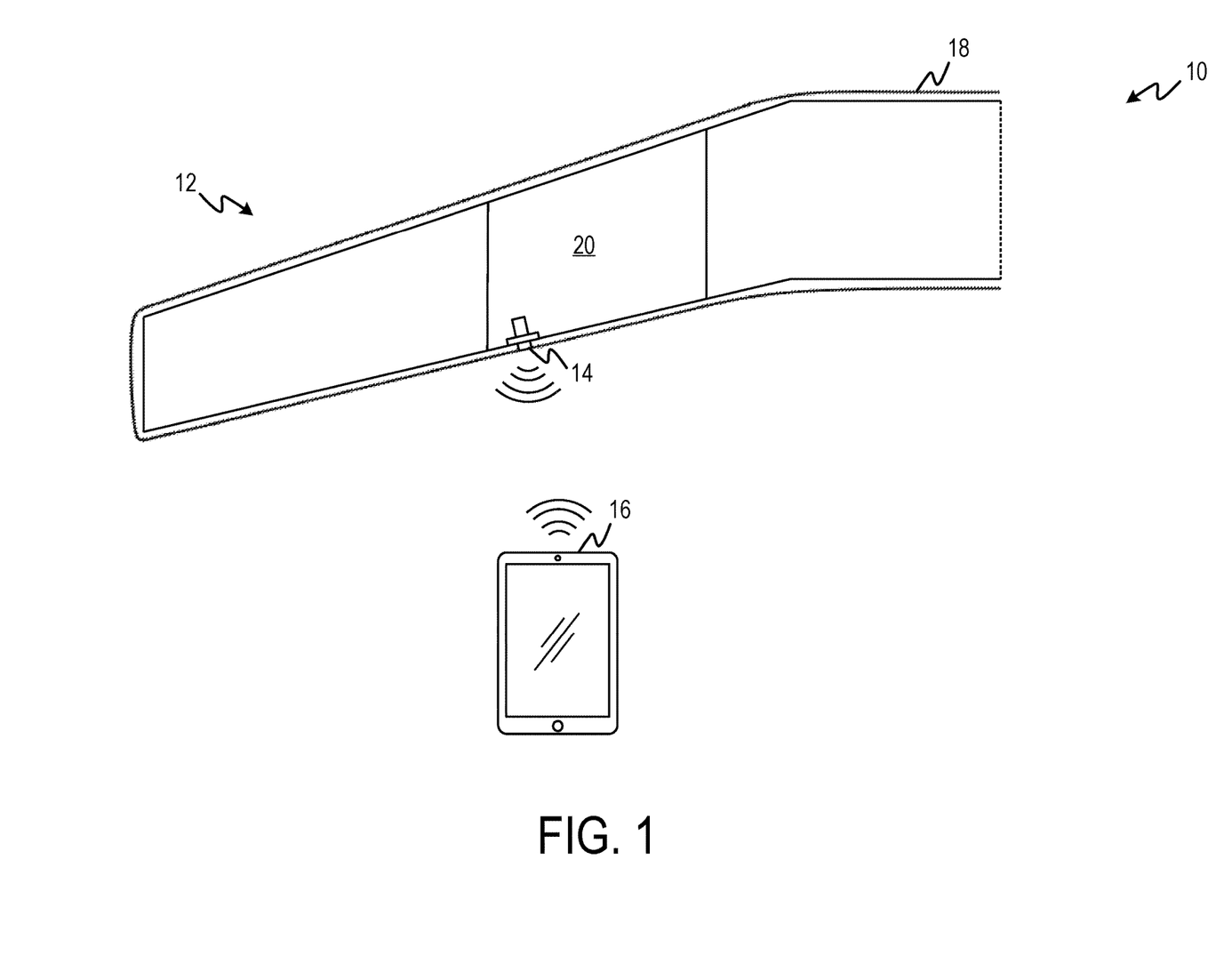
FIG. 1 illustrates a wireless liquid gauging system being used on a tank of an aircraft.

FIG. 1 illustrates an aircraft wireless liquid gauging system 10 including aircraft wing 12, wireless pressure sensor 14, and computing device 16. Aircraft wing 12 includes wing skin 18 and tank 20.

Wireless pressure sensor 14 is installed in tank 20. Wireless pressure sensor 14 is installed such that the bottom end containing an antenna is flush with wing skin 18. The housing of wireless pressure sensor 14 is hermetically sealed. In one example, the hermetically sealed housing is made of stainless steel. At least a portion of the hermetically sealed housing is a diaphragm exposed to the liquid of tank 20. The hermetically sealed housing is conductively coupled to wing skin 18. In one example, wireless pressure sensor 14 is screwed into a threaded mount of wing skin 18, thereby conductively coupling and mechanically coupling them. Conductively coupling the hermetically sealed housing to wing skin 18 puts the hermetically sealed housing at equipotential with the wing skin, which protects the liquid of tank 20 from electromagnetic interference and lightning strikes.

Computing device 16 is shown wirelessly communicating with wireless pressure sensor 14. Computing device 16, for example, can be a tablet, a refueling operations computer, a flight planning computer, the aircraft cockpit's electronic flight bag, etc. Computing device 16 is configured to query wireless sensor 14 for sensed data. Wireless pressure sensor 14 includes at least one pressure sensor and at least one temperature sensor. Wireless pressure sensor 14 is configured to sense a pressure and a temperature of the liquid in response to the query. Once the pressure and temperature have been sensed, wireless pressure sensor 14 is configured to transmit data corresponding to the pressure and temperature sensed by wireless pressure sensor 14. Computing device 16 is configured to determine a liquid quantity of tank 20 using the sensed pressure and temperature of the liquid, a sensed ambient temperature and pressure, and the geometry of tank 20. Ambient temperature and pressure are the local atmospheric pressure and temperature.

Figure 2:
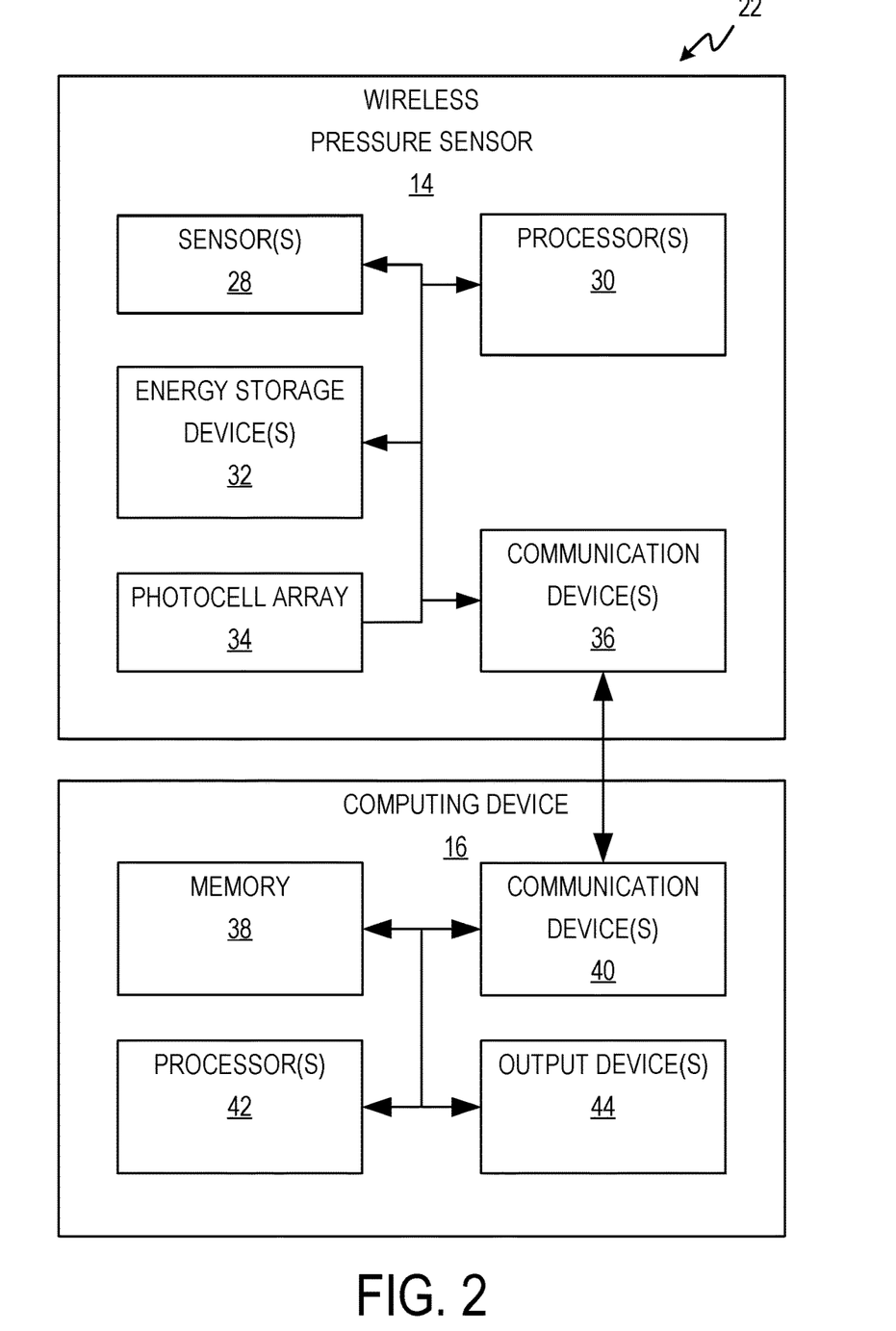
FIG. 2 is a block diagram of a wireless liquid gauging system of an aircraft.

FIG. 2 is a block diagram of wireless liquid gauging system 22. Wireless liquid gauging system 22 includes wireless pressure sensor 14 and computing device 16. Wireless pressure sensor 14 includes sensor(s) 28, processor(s) 30, energy storage device(s) 32, photocell array 34, and communication device(s) 36. Computing device 16 includes memory 36, communication device(s) 38, processor(s) 40, and output device(s) 42.

Wireless pressure sensor 14 is configured to have two operative states, sleep/standby mode and sensing mode. During sleep mode, processor(s) 30 runs at a lower frequency than sensing mode, draws enough power to maintain the contents of volatile memory, and occasionally checks for queries via communication device(s) 36. Also during sleep mode, sensor(s) 28 do not sense any parameters, keeping their power draw minimal. During sensing mode, processor(s) 30 runs at a higher frequency than in sleep mode, draws enough power to actively run programs, and receives sensed data from sensor(s) 28. Wireless pressure sensor 14 is configured to stay in sleep mode until a query is received via communication device(s) 36. In response to receiving a query, wireless pressure sensor 14 is configured to operate in sensing mode long enough to sense one or more parameters using sensor(s) 28 and transmit data corresponding to the one or more sensed parameters to the querying device. Once the data has been transmitted, wireless pressure sensor 14 is configured to return to operating in sleep mode.

Sensor(s) 28 is configured to receive power from energy storage device(s) 36. When wireless pressure sensor 14 is in sleep mode, sensor(s) 28 does not sense parameters, thereby conserving power. When wireless pressure sensor 14 is in sensing mode, sensor(s) 28 senses one or more parameters and transmits data corresponding to the sensed parameters to processor(s) 30. Sensor(s) 28, in one example, includes a pressure sensor configured to sense a pressure of the liquid of a tank. The pressure sensor senses a pressure exerted by the liquid on a diaphragm of the wireless pressure sensor housing. In one example, sensor(s) 28 includes a temperature sensor for sensing a temperature of the liquid. In one example, sensor(s) 28 includes an ambient pressure sensor to measure the ambient pressure.

Processor(s) 30, in one example, is configured to implement functionality and/or process instructions for execution within wireless pressure sensor 14. For instance, processor(s) 30 can be capable of processing instructions stored in memory of processor(s) 30. Examples of processor(s) 30 can include any one or more of a microprocessor, a controller, a digital signal processor (DSP), an application specific integrated circuit (ASIC), a field-programmable gate array (FPGA), or other equivalent discrete or integrated logic circuitry. In one example, processor(s) 30 are configured to receive data corresponding to the sensed one or more parameters and translate the data for transmission by communication device(s) 36.

Energy storage device(s) 32, in one example, is configured to receive and store power from photocell array 34. Energy storage device(s) 32 is also configured to provide power to the electronics of wireless pressure sensor 14, including sensor(s) 28, processor(s) 30, and communication device(s) 36. In one example, energy storage device(s) 32 is a battery, a capacitor, or both. In one example, the capacitor is a super capacitor.

Photocell array 34 is configured to generate power from sources of light. In one example, the sources of light include ambient light and/or light from an optical emitter. Photocell array 34 is configured to provide power to energy storage device(s) 32 for storing. In one example, photocell array 34 provides power directly to sensor(s) 28, processor(s) 30, and communication device(s) 36. The combination of photocell array 34 and energy storage device(s) 32 allows wireless pressure sensor 14 to generate and store power from ambient light throughout the day. If energy storage device(s) 32 are depleted of power, light can be shined on photocell array 34, for example from an optical emitter, to power wireless pressure sensor 14.

Wireless pressure sensor 14, as illustrated in FIG. 2, also includes communication device(s) 36. Wireless pressure sensor 14, in one example, utilizes communication device(s) 36 to communicate with external devices via one or more wireless networks. Communication device(s) 36 can include a radio frequency transceiver, or any other type of device that can send and receive information. Other examples of such network interfaces can include Bluetooth, 3G, 4G, and WiFi radio computing devices. In one example, communication device(s) 36 is configured to transmit data to and receive data from computing device 16. Data transmitted by communication device(s) 36 includes one or more sensed parameters.

Computing device 16 can be a tablet, a smart phone, a liquid operations computer, a flight planning computer, the aircraft cockpit's electronic flight bag, etc. Computing device 16, in one example, utilizes communication device(s) 40 to communicate with external devices via one or more wired or wireless networks, or both. Computing device 16 is configured to provide a query to and receive data from wireless pressure sensor 14. Computing device 16 is also configured to determine the liquid quantity of the tank using the pressure of the liquid, the temperature of the liquid, the ambient pressure, and the geometry of the tank holding the liquid. In one example, computing device 16 uses subtracts the ambient pressure from the pressure of the liquid. The difference in pressure is then used with the geometry of the tank to calculate the mass, or quantity, of the liquid. Computing device 16, in one example, is further configured to communicate with other computing devices such as laptops, phones, electronic flight bags, etc. Computing device 16, in one example, utilizes communication device(s) 40 to communicate with external devices via one or more wired or wireless networks, or both. Communication devices 40 can include a network interface card, such as an Ethernet card, an optical transceiver, a radio frequency transceiver, or any other type of device that can send and receive information. Other examples of such network interfaces can include Bluetooth, 3G, 4G, and WiFi radio computing devices, as well as Universal Serial Bus (USB).

Processor(s) 42, in one example, is configured to implement functionality and/or process instructions for execution within computing device 16. For instance, processor(s) 42 can be capable of processing instructions stored in computer-readable memory 38. Examples of processor(s) 42 can include any one or more of a microprocessor, a controller, a digital signal processor (DSP), an application specific integrated circuit (ASIC), a field-programmable gate array (FPGA), or other equivalent discrete or integrated logic circuitry. In one example, processor(s) 42 is configured to determine the quantity of the liquid using the data corresponding to the pressure and temperature of the liquid, the ambient pressure, and the geometry of the tank containing the liquid. In a further example, the liquid is liquid of an aircraft and the tank is a tank of the aircraft.

Computer-readable memory 38 can be configured to store information within computing device 16 during operation. Computer-readable memory 38, in some examples, is described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 38 is a temporary memory, meaning that a primary purpose of computer-readable memory 38 is not long-term storage. Computer-readable memory 38, in some examples, is described as a volatile memory, meaning that Computer-readable memory 38 does not maintain stored contents when power to computing device 16 is removed. Examples of volatile memories can include random access memories (RAM), dynamic random access memories (DRAM), static random access memories (SRAM), and other forms of volatile memories. In some examples, computer-readable memory 38 is used to store program instructions for execution by processor(s) 42. Computer-readable memory 38, in certain examples, is used by software applications running on computing device 16 to temporarily store information during program execution, such as transmitting and receiving data using communication device(s) 38, providing a graphical user interface via output device(s) 44, and/or determining the liquid quantity of a tank.

Computer-readable memory 38, in some examples, also include one or more computer-readable storage media. Computer-readable memory 38 can be configured to store larger amounts of information than volatile memory. Computer-readable memory 38 can further be configured for long-term storage of information. In some examples, Computer-readable memory 38 include non-volatile storage elements. Examples of non-volatile storage elements can include magnetic hard discs, optical discs, floppy discs, flash memories, or forms of electrically programmable memories (EPROM) or electrically erasable and programmable (EEPROM) memories. In one example, Computer-readable memory 38 is configured to store data including the geometry of the tank holding the liquid.

Output device(s) 44 can be configured to provide output to a user. Examples of output device(s) 44 can include a display device, a sound card, a video graphics card, a speaker, a cathode ray tube (CRT) monitor, a liquid crystal display (LCD), or another type of device for outputting information in a form understandable to users or machines. In one example, output device(s) 44 is configured to display the determined liquid quantity. In one example, output device(s) 44 is a graphical user interface.

Figure 3A:
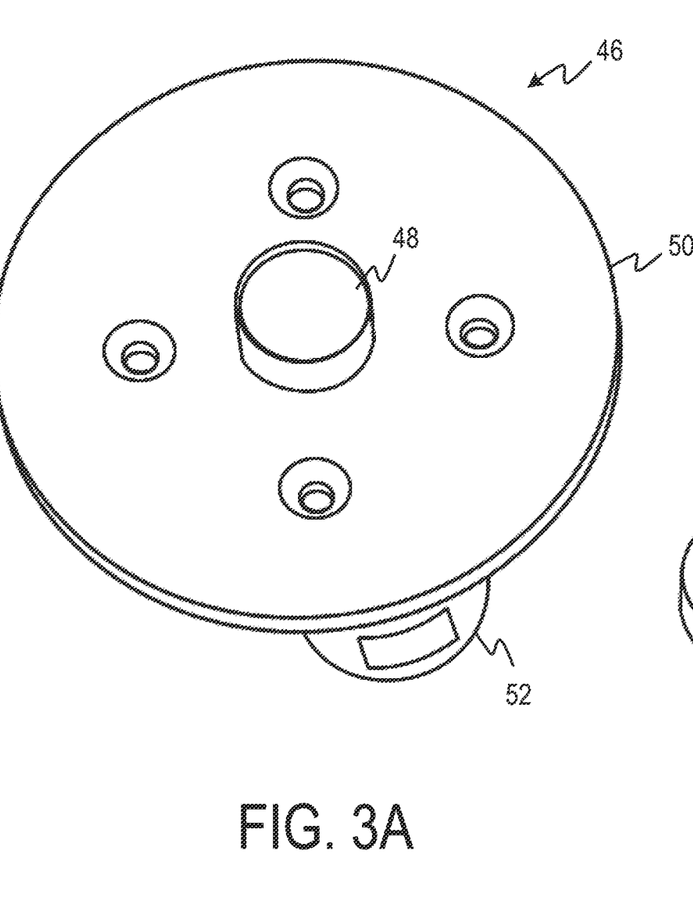
FIGS. 3A and 3B are perspective views of a wireless pressure sensor housing.
Figure 3B:
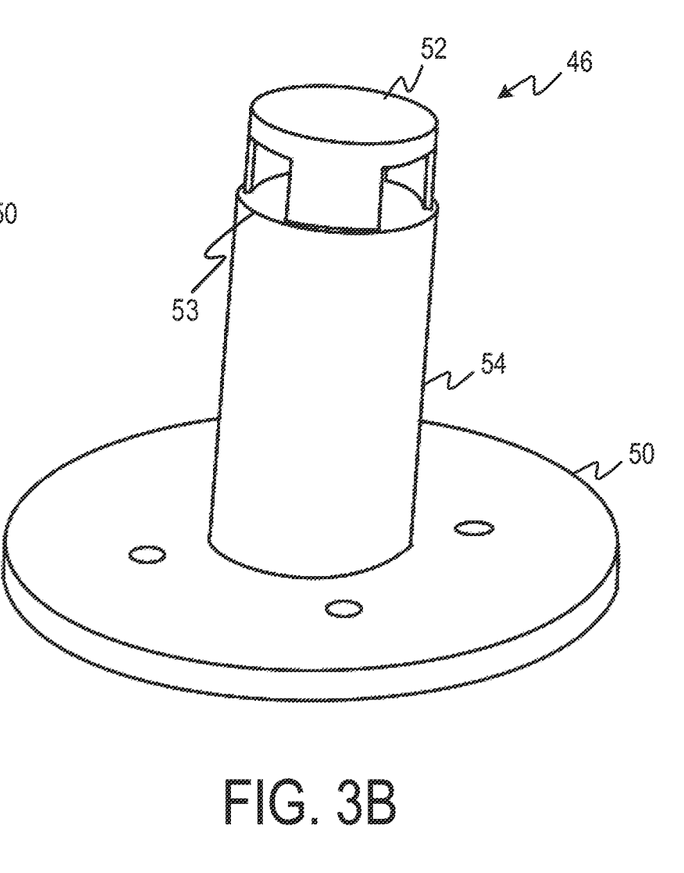

FIGS. 3A and 3B are perspective views of wireless pressure sensor housing 46. Wireless pressure sensor housing 46 includes photocell array window 48, attachment plate 50, top hat 52, diaphragm 53, and electronics housing 54.

Photocell array window 48 is located at a bottom portion of wireless pressure sensor housing 46. Photocell array window 48 allows light to reach the photocell array while protecting the photocell array from external elements such as debris, moisture, and/or other hazards. Photocell array window 48 can be made of borosilicate glass, polycarbonate, silicone, or other optically transparent material. Attachment plate 50 includes holes for fasteners to attach wireless pressure sensor housing 46 to the tank to be monitored. Top hat 52 is configured to protect the diaphragm located at the top of electronics housing 54. Top hat 52 includes openings on the sides to allow liquid to contact the diaphragm. Electronics housing 54 includes diaphragm 53. Diaphragm 53 forms at least a portion of the top surface of electronics housing 54.

Figure 4:
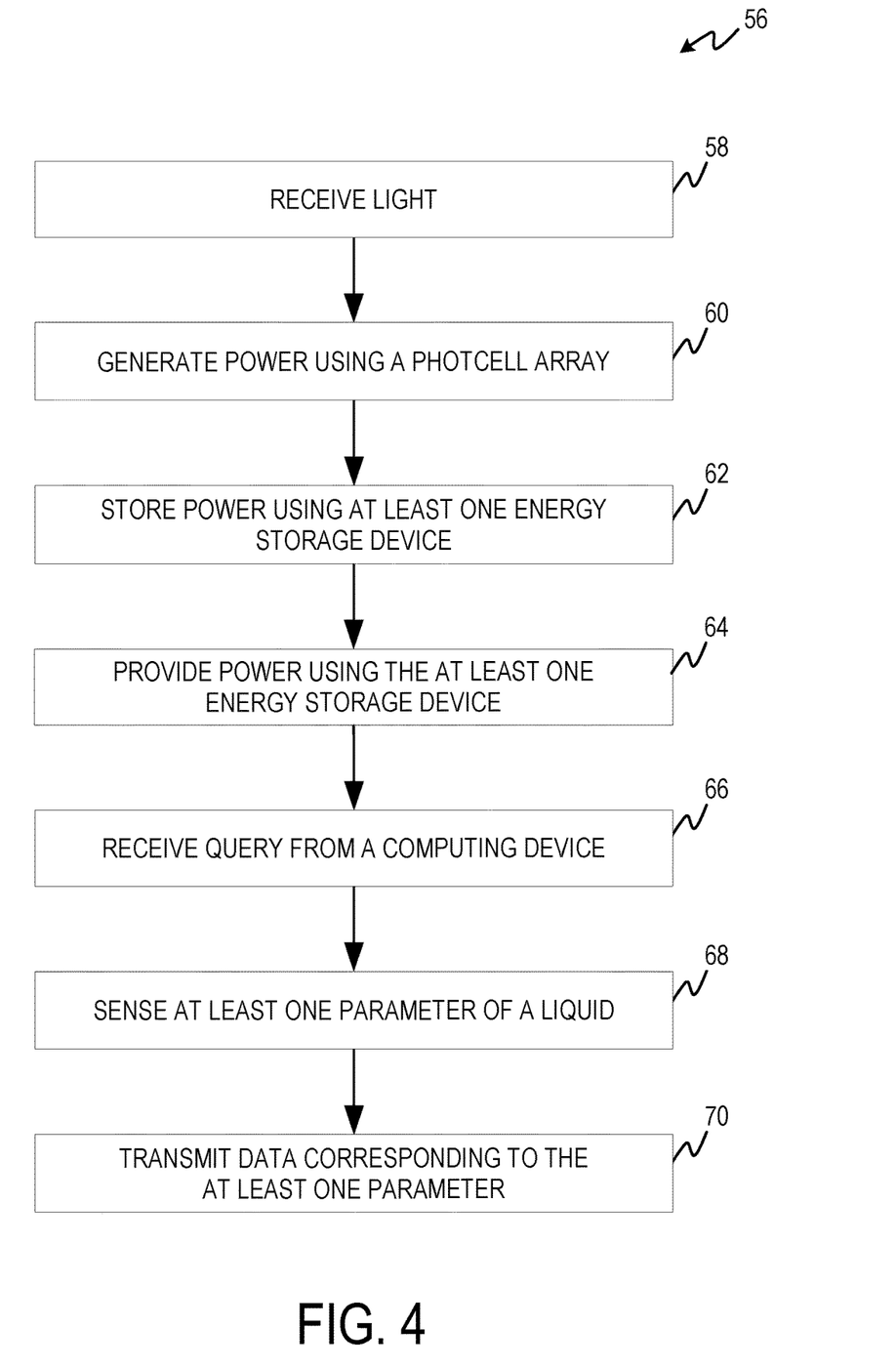
FIG. 4 is a flow diagram depicting a process for measuring a parameter of a region by a wireless pressure sensor.

FIG. 4 is a flow diagram depicting process 56 for measuring a parameter of a region by a wireless pressure sensor. For purposes of clarity and ease of discussion, the example operations are described below within the context of wireless pressure sensor 14 of FIG. 2.

At step, 58 light is received via photocell array 34. In one example, the light is ambient light. In another example, the light is light from an optical emitter such as a flashlight. At step 60, power is generated from the received light using photocell array 34 in response to the light being received. At step 62, power is stored using energy storage device(s) 32 in response to power being generated. At step 64, at least communication device(s) 36 and sensor(s) 28 are powered in response to power being stored in energy storage device(s) 32. In one example, processor(s) 30 is also powered. At step 66, a query provided by computing device 16 is received by wireless pressure sensor 14 via communication device(s) 36. At step 68, one or more parameters of a liquid are sensed using sensor(s) 28. The one or more parameters can be temperature and/or pressure of a liquid and the ambient pressure. At step 70, data corresponding to the one or more parameters are transmitted using communication device(s) 36. In one example, communication device(s) 36 uses WiFi to transmit the data.

Accordingly, implementing techniques of this disclosure, wireless liquid gauging systems can determine a liquid quantity of a tank. Using the wireless pressure sensor described herein, a pressure and temperature of a liquid can be sensed without exposing the liquid to electrical power. This allows liquid quantities to be measured without the risk of fire, or an explosion. Using the computing device described herein allows a user to query the wireless pressure sensor to determine a liquid quantity of an aircraft without leaving the ground.

Discussion of Possible Embodiments

The following are non-exclusive descriptions of possible embodiments of the present invention.

A wireless pressure sensor for sensing pressure of a liquid in a tank can comprise a hermetically sealed housing with at least a portion of the housing having a diaphragm, the hermetically sealed housing forming at least a portion of a hermetically sealed wall of the tank; at least one sensor within the hermetically sealed housing configured to sense the pressure of the liquid; at least one photocell array configured to receive light and generate power from the light; at least one communication device configured to transmit data corresponding to the sensed pressure using wireless radio frequency signals; and at least one energy storage device configured to store power generated by the at least one photocell array and provide power to the at least one sensor and the at least one communication device.

The wireless pressure sensor of the preceding paragraph can optionally include, additionally and/or alternatively, any one or more of the following features, configurations and/or additional components:

An ambient pressure sensor can be configured to sense an ambient pressure; and wherein the at least one communication device can be further configured to transmit data corresponding to the sensed ambient pressure.

At least one temperature sensor can be configured to sense a temperature of the liquid; and wherein the at least one communication device can be further configured to transmit data corresponding to the sensed temperature.

The liquid can be fuel of an aircraft.

The hermetically sealed housing can be electrically coupled to a wing skin of the aircraft.

The hermetically sealed housing can be stainless steel.

The at least one energy storage device can be a battery.

A system can comprise a wireless pressure sensor for sensing pressure of a liquid in a tank comprising: a hermetically sealed housing with at least a portion of the housing having a diaphragm, the hermetically sealed housing forming at least a portion of a hermetically sealed wall of the tank; at least one sensor within the hermetically sealed housing configured to sense the pressure of the liquid; at least one photocell array configured to receive light and generate power from the light; at least one communication device configured to transmit data corresponding to the sensed pressure using wireless radio frequency signals; and at least one energy storage device configured to store power generated by the at least one photocell array and provide power to the at least one sensor and the at least one communication device; and a computing device configured to receive the data from the at least one communication device.

The system of the preceding paragraph can optionally include, additionally and/or alternatively, any one or more of the following features, configurations and/or additional components:

At least one ambient pressure sensor can be configured to sense an ambient pressure; and wherein the computing device can be further configured to receive data corresponding to the sensed ambient pressure.

The at least one ambient pressure sensor can be included in the wireless pressure sensor; and wherein the communication device can be further configured to transmit data corresponding to the sensed ambient pressure.

The wireless pressure sensor can be further comprises at least one temperature sensor to measure a temperature of the liquid; and wherein the at least one communication device can be further configured to transmit data corresponding to the sensed temperature.

A memory can be configured to store a geometry of the tank holding the liquid; and a processor can be configured to determine a liquid quantity of the liquid using the data corresponding to the sensed temperature of the liquid, the data corresponding to the sensed pressure of the liquid, data corresponding to the sensed ambient temperature, and the geometry of the tank holding the liquid.

The computing device can be configured to display, using a graphical user interface, the liquid quantity to a user.

The computing device can be a tablet.

The data can be transmitted by the at least one communication device using WiFi.

The at least one energy storage device can include a battery.

The at least one energy storage device can include a capacitor.

A method for sensing a pressure of a liquid of a tank, the method can comprise receiving light via a photocell array; generating, in response to receiving the light, power from the received light using the photocell array; storing power, in response to power being generated, using one or more energy storage devices; powering, in response to the power being stored, at least one communication device and at least one sensor; receiving a query from a computing device using at least one communication device; sensing, in response to receiving the query, the pressure of the liquid of the tank using at least one sensor; and transmitting, in response to sensing the pressure, data corresponding to the sensed pressure of the liquid using the at least one communication device.

The method of the preceding paragraph can optionally include, additionally and/or alternatively, any one or more of the following features, configurations and/or additional components:

Sensing, in response to receiving the query, an ambient pressure using an ambient pressure sensor; and transmitting, in response to sensing the ambient pressure, data corresponding to the sensed ambient pressure using the at least one communication device.

Sensing, in response to receiving the query, a temperature of the liquid using at least one temperature sensor; and transmitting, in response to sensing the temperature, data corresponding to the sensed temperature of the liquid using the at least one communication device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wireless pressure sensor for sensing pressure of a liquid in a tank comprising:
   a hermetically sealed housing with at least a portion of the housing having a diaphragm, the hermetically sealed housing forming at least a portion of a hermetically sealed wall of the tank;
   at least one sensor within the hermetically sealed housing configured to sense the pressure of the liquid;
   at least one photocell array configured to receive light and generate power from the light;
   at least one communication device configured to transmit data corresponding to the sensed pressure using wireless radio frequency signals; and
   at least one energy storage device configured to store power generated by the at least one photocell array and provide power to the at least one sensor and the at least one communication device.

2. The wireless pressure sensor of claim 1, further comprising an ambient pressure sensor configured to sense an ambient pressure; and
   wherein the at least one communication device is further configured to transmit data corresponding to the sensed ambient pressure.

3. The wireless pressure sensor of claim 1, further comprising:
   at least one temperature sensor configured to sense a temperature of the liquid; and
   wherein the at least one communication device is further configured to transmit data corresponding to the sensed temperature.

4. The wireless pressure sensor of claim 1, wherein the liquid is fuel of an aircraft.

5. The wireless pressure sensor of claim 4, wherein the hermetically sealed housing is electrically coupled to a wing skin of the aircraft.

6. The wireless pressure sensor of claim 1, wherein the hermetically sealed housing is stainless steel.

7. The wireless pressure sensor of claim 1, wherein the at least one energy storage device is a battery.

8. A system comprising:
a wireless pressure sensor for sensing pressure of a liquid in a tank comprising:
  a hermetically sealed housing with at least a portion of the housing having a diaphragm, the hermetically sealed housing forming at least a portion of a hermetically sealed wall of the tank;
  at least one sensor within the hermetically sealed housing configured to sense the pressure of the liquid;
  at least one photocell array configured to receive light and generate power from the light;
  at least one communication device configured to transmit data corresponding to the sensed pressure using wireless radio frequency signals; and
  at least one energy storage device configured to store power generated by the at least one photocell array and provide power to the at least one sensor and the at least one communication device; and
a computing device configured to receive the data from the at least one communication device.

9. The system of claim 8, wherein the system further comprises:
at least one ambient pressure sensor configured to sense an ambient pressure; and
wherein the computing device is further configured to receive data corresponding to the sensed ambient pressure.

10. The system of claim 9, wherein the at least one ambient pressure sensor is included in the wireless pressure sensor; and
wherein the communication device is further configured to transmit data corresponding to the sensed ambient pressure.

11. The system of claim 10, wherein the wireless pressure sensor further comprises at least one temperature sensor to measure a temperature of the liquid; and
wherein the at least one communication device is further configured to transmit data corresponding to the sensed temperature.

12. The system of claim 11, wherein the computing device further comprises:

a memory configured to store a geometry of the tank holding the liquid; and
a processor configured to determine a liquid quantity of the liquid using the data corresponding to the sensed temperature of the liquid, the data corresponding to the sensed pressure of the liquid, data corresponding to the sensed ambient temperature, and the geometry of the tank holding the liquid.

13. The system of claim 12, wherein the computing device is configured to display, using a graphical user interface, the liquid quantity to a user.

14. The system of claim 12, wherein the computing device is a tablet.

15. The system of claim 9, wherein the data is transmitted by the at least one communication device using WiFi.

16. The system of claim 9, wherein the at least one energy storage device includes a battery.

17. The system of claim 16, wherein the at least one energy storage device further includes a capacitor.

18. A method for sensing a pressure of a liquid of a tank, the method comprising:
receiving light via a photocell array;
generating, in response to receiving the light, power from the received light using the photocell array;
storing power, in response to power being generated, using one or more energy storage devices;
powering, in response to the power being stored, at least one communication device and at least one sensor;
receiving a query from a computing device using at least one communication device;
sensing, in response to receiving the query, the pressure of the liquid of the tank using at least one sensor; and
transmitting, in response to sensing the pressure, data corresponding to the sensed pressure of the liquid using the at least one communication device.

19. The method of claim 18, further comprising:
sensing, in response to receiving the query, an ambient pressure using an ambient pressure sensor; and
transmitting, in response to sensing the ambient pressure, data corresponding to the sensed ambient pressure using the at least one communication device.

20. The method of claim 18, further comprising:
sensing, in response to receiving the query, a temperature of the liquid using at least one temperature sensor; and
transmitting, in response to sensing the temperature, data corresponding to the sensed temperature of the liquid using the at least one communication device.

* * * * *